United States Patent
Suzuki

(10) Patent No.: US 9,531,942 B2
(45) Date of Patent: Dec. 27, 2016

(54) IMAGING LENS AND IMAGING APPARATUS

(71) Applicant: FUJIFILM Corporation, Tokyo (JP)

(72) Inventor: Takashi Suzuki, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 46 days.

(21) Appl. No.: 14/606,301

(22) Filed: Jan. 27, 2015

(65) Prior Publication Data

US 2015/0212302 A1 Jul. 30, 2015

(30) Foreign Application Priority Data

Jan. 30, 2014 (JP) .................................. 2014-015509

(51) Int. Cl.
| | | |
|---|---|---|
| G02B 9/00 | (2006.01) | |
| H04N 5/232 | (2006.01) | |
| G02B 13/00 | (2006.01) | |
| G02B 9/08 | (2006.01) | |
| G02B 9/06 | (2006.01) | |
| G02B 9/64 | (2006.01) | |

(52) U.S. Cl.
CPC ............ *H04N 5/23212* (2013.01); *G02B 9/00* (2013.01); *G02B 9/06* (2013.01); *G02B 9/08* (2013.01); *G02B 13/002* (2013.01); *G02B 13/0015* (2013.01); *G02B 13/0045* (2013.01); *G02B 9/64* (2013.01)

(58) Field of Classification Search
CPC ............ G02B 13/0015; G02B 13/0045; G02B 13/002; G02B 9/64; G02B 9/00; G02B 9/06; G02B 9/08; H04N 5/23212
USPC .......................... 359/794, 793, 754, 786, 787
See application file for complete search history.

(56) References Cited

U.S. PATENT DOCUMENTS

| | | | | |
|---|---|---|---|---|
| 4,176,913 A | * | 12/1979 | Nakamura ............. | G02B 13/02 359/745 |
| 6,471,359 B1 | * | 10/2002 | Kim ....................... | G02B 13/06 353/122 |
| 7,423,819 B1 | * | 9/2008 | Chuang .................. | G02B 13/18 359/651 |
| 2005/0088756 A1 | * | 4/2005 | Yamada ................ | G02B 27/646 359/687 |
| 2007/0279762 A1 | * | 12/2007 | Tomioka .............. | G02B 15/173 359/684 |
| 2008/0123191 A1 | * | 5/2008 | Suzaki .................. | G02B 15/173 359/555 |

(Continued)

FOREIGN PATENT DOCUMENTS

| | | |
|---|---|---|
| JP | 2011-158739 | 8/2011 |
| WO | WO 2011/108428 | 9/2011 |

*Primary Examiner* — Bumsuk Won
*Assistant Examiner* — William R Alexander
(74) *Attorney, Agent, or Firm* — Young & Thompson

(57) ABSTRACT

An imaging lens consists essentially of, in order from the object side, a first lens group having a positive refractive power, a stop, and a second lens group having a positive refractive power. The first lens group includes, in order from the object side, two successive positive lenses, and a negative lens having a concave surface toward the image side. The second lens group includes, in order from the object side, a lens having at least one aspheric surface, and a three-lens cemented lens. The three-lens cemented lens has a positive refractive power, and is formed by cementing three lenses consisting of, in order from the object side, a positive lens having a convex surface toward the image side, a negative lens, and a positive lens.

14 Claims, 6 Drawing Sheets

EXAMPLE 1

(56) References Cited

U.S. PATENT DOCUMENTS

| | | | |
|---|---|---|---|
| 2009/0168179 A1* | 7/2009 | Toyoda | G02B 15/173 359/557 |
| 2012/0327289 A1 | 12/2012 | Souma et al. | |
| 2013/0141797 A1* | 6/2013 | Hagiwara | G02B 15/173 359/684 |

* cited by examiner

EXAMPLE 1

EXAMPLE 2

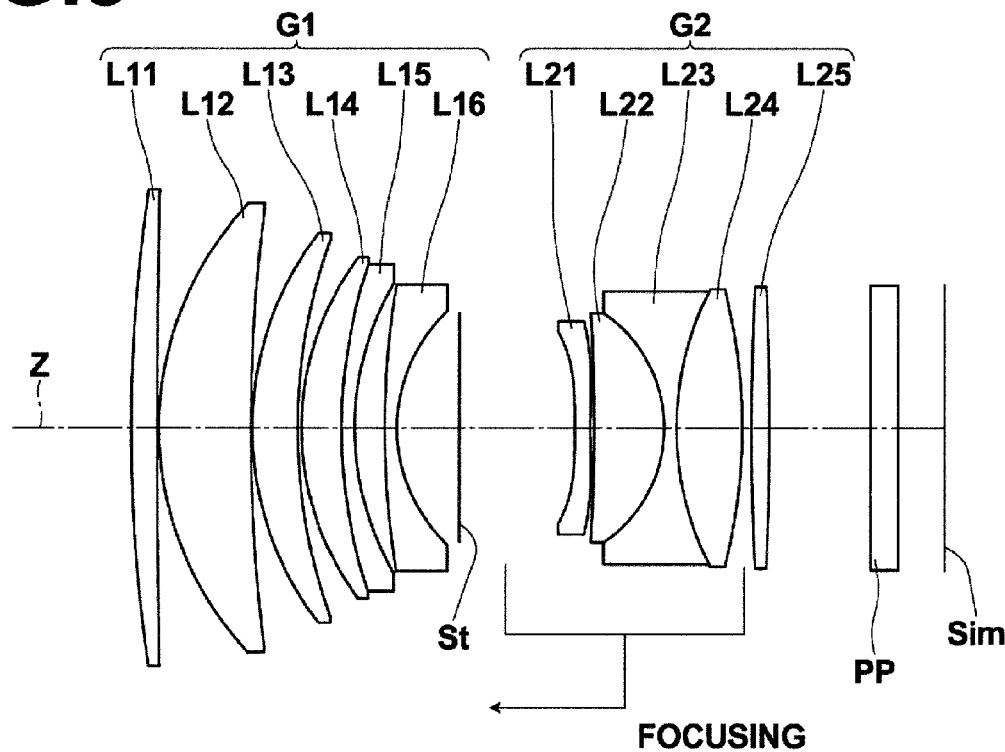
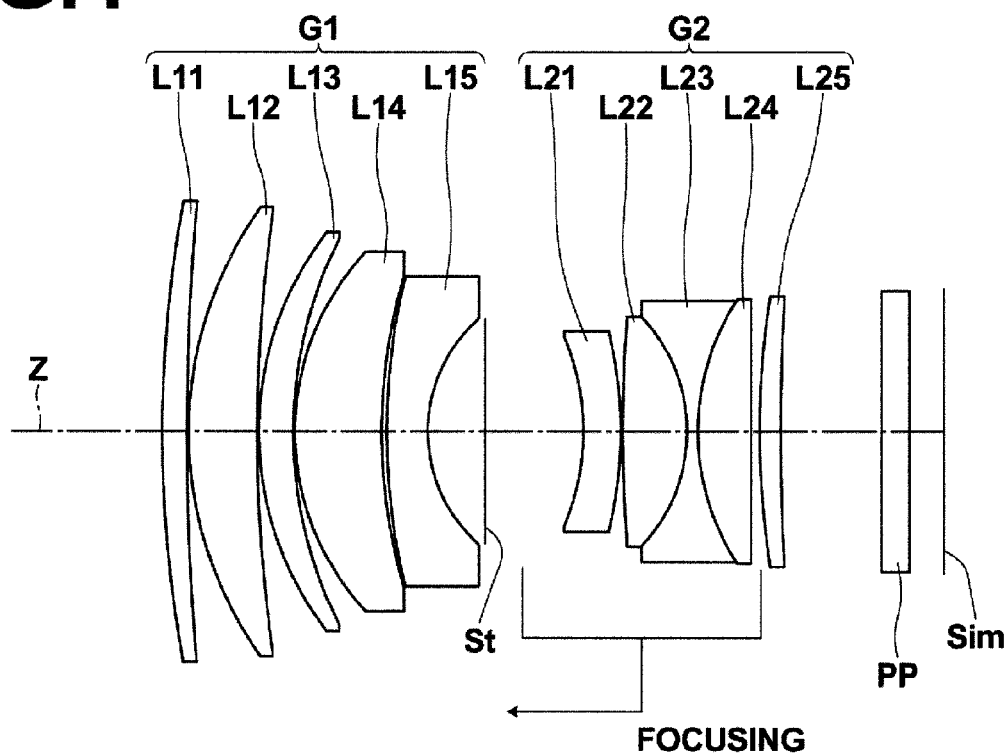

EXAMPLE 5

EXAMPLE 1

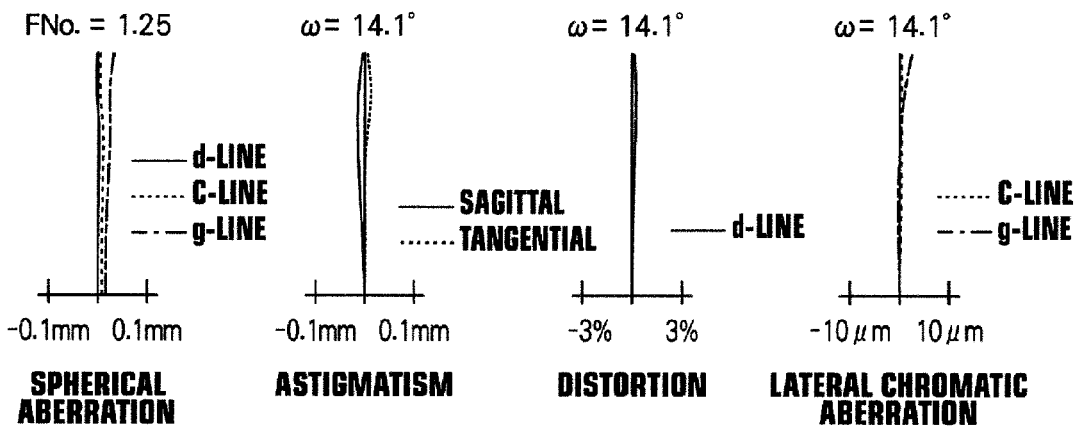
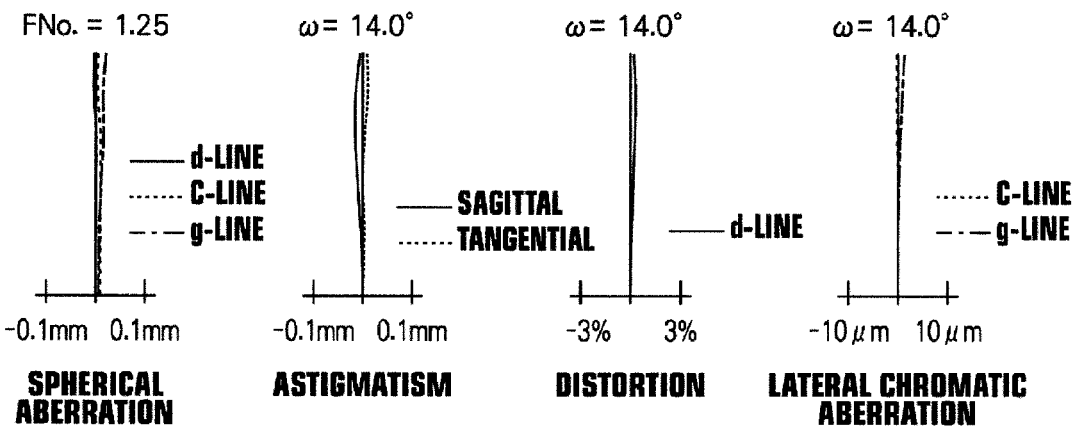

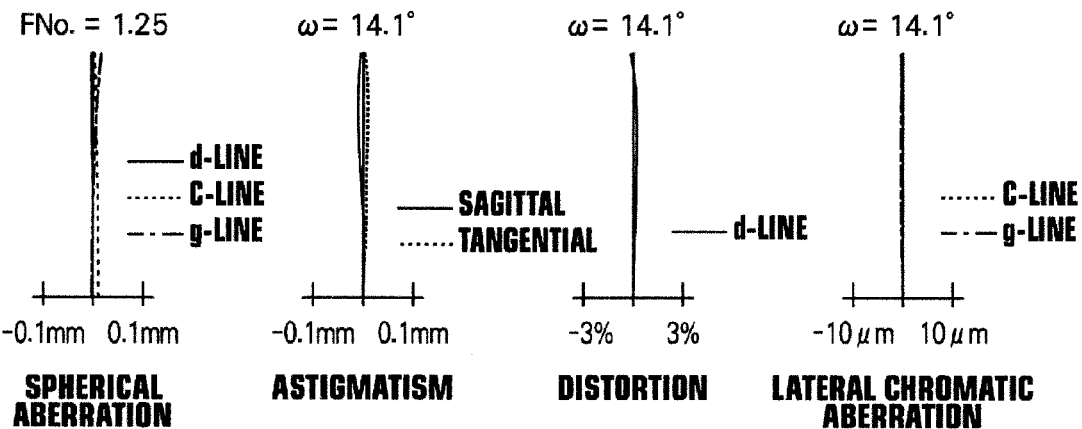
FIG.9 EXAMPLE 4
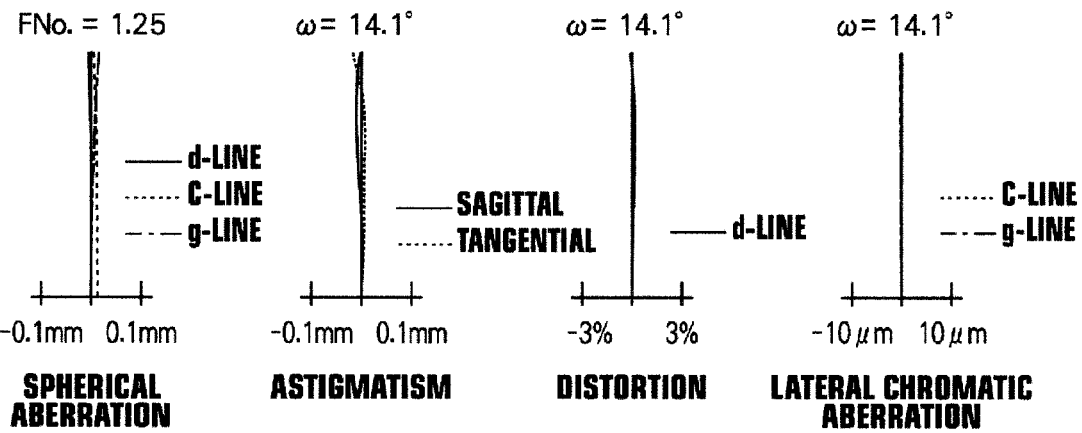
FIG.10 EXAMPLE 5

IMAGING LENS AND IMAGING APPARATUS

CROSS-REFERENCE TO RELATED APPLICATIONS

The present application claims priority under 35 U.S.C. §119 to Japanese Patent Application No. 2014-015509, filed on Jan. 30, 2014. The above application is hereby expressly incorporated by reference, in its entirety, into the present application.

BACKGROUND OF THE INVENTION

Field of the Invention

The present invention relates to an imaging lens that is particularly suitable for use with electronic cameras, and an imaging apparatus provided with the imaging lens.

Description of the Related Art

In recent years, many digital cameras provided with a large image sensor conforming to the APS format or the Four Thirds format, for example, are launched into the market. Also, besides digital single-lens reflex cameras, lens-interchangeable digital cameras and compact cameras which use the above-described large image sensor and are not provided with a reflex finder are recently launched into the market. Advantages of such cameras lie in that they have a compact entire system and are highly portable, while achieving high image quality. Along with the more and more compact design of cameras, there are increasing demands for a lens system having a small entire length.

Examples of a large-aperture imaging lens having an f-number of around F1.4 while being usable with the above-described large image sensor have been proposed, for example, in Japanese Unexamined Patent Publication No. 2011-158739, and International Patent Publication No. WO2011/108428 (hereinafter, Patent Documents 1 and 2, respectively). In both the imaging lenses disclosed in Patent Documents 1 to 2, a strong concave surface toward the object side is disposed on the image side of the stop to thereby achieve a lens configuration that provides a long flange back (or flange focal length).

SUMMARY OF THE INVENTION

As imaging lens used as an interchangeable lens of a camera, in particular, a single-lens reflex camera, has a lens configuration where a strong concave surface is disposed on the image side of the stop to provide a long flange back for inserting various optical elements between the lens system and the image sensor or for ensuring a sufficient optical path length for the reflex finder.

On the other hand, some of the imaging apparatus employing the above-described large image sensor conforming to the APS format, or the like, such as a lens-interchangeable camera that does not have a reflex finder or a compact camera with unchangeable lens, may not require a back focus as long as one required for an interchangeable lens of a single-lens reflex camera, depending on the configuration.

Since both the imaging lenses disclosed in Patent Documents 1 to 2 have a lens configuration where a strong concave surface is disposed on the image side of the stop to provide a long flange back, they necessarily have a long entire optical length.

In a case where the imaging lens disclosed in Patent Document 1 or 2 is used with an imaging apparatus that employs the above-described large image sensor conforming to the APS format, or the like, high optical performance can be ensured. However, there are also demands for such an imaging lens having a small entire length for use with highly-portable imaging apparatus having a compact entire system.

In view of the above-described circumstances, the present invention is directed to providing an imaging lens that has a small entire length and a large aperture while ensuring high optical performance for use with a large image sensor, and an imaging apparatus provided with the imaging lens.

An aspect of the imaging lens of the invention consisting essentially of, in order from an object side: a first lens group having a positive refractive power; a stop; and a second lens group having a positive refractive power, wherein the first lens group comprises, in order from the object side, two successive positive lenses, and a negative lens having a concave surface toward an image side, and the second lens group comprises, in order from the object side, a lens having at least one aspheric surface, and a three-lens cemented lens, wherein the three-lens cemented lens is formed by cementing three lenses consisting of, in order from the object side, a positive lens having a convex surface toward the image side, a negative lens, and a positive lens, and the three-lens cemented lens has a positive refractive power.

In the imaging lens of the invention, it is preferred that the first lens group be fixed relative to the image plane during focusing from an object at infinity to a close object.

It is preferred that the condition expression (1) below be satisfied, and it is more preferred that the condition expression (1-1) below be satisfied:

$$1.8 < Nd2 \tag{1},$$

$$1.85 < Nd2 \tag{1-1},$$

where Nd2 is an average value of refractive indices with respect to the d-line of the positive lenses in the three-lens cemented lens.

It is preferred that the condition expression (2) below be satisfied:

$$4 < \nu d2p - \nu d2n \tag{2},$$

where vd2p is an Abbe number of a positive lens having a higher Abbe number with respect to the d-line than that of the other of the two positive lenses in the three-lens cemented lens, and vd2n is an Abbe number with respect to the d-line of the negative lens in the three-lens cemented lens.

It is preferred that the first lens group successively comprise, in order from the object side, a positive lens, a positive lens having a convex surface toward the object side, and a positive meniscus lens having a convex surface toward the object side.

It is preferred that the second lens group comprise, in order from the object side, a lens having at least one aspheric surface, the three-lens cemented lens, and at least one positive lens, wherein, during focusing from an object at infinity to a close object, a part of the second lens group from a lens disposed on the image side of the three-lens cemented lens to a lens disposed at the most image side position in the second lens group is fixed relative to the image plane.

It is preferred that focusing from an object at infinity to a close object be performed by moving the entire second lens group toward the object side or by moving a part of the second lens group including the lens having at least one aspheric surface and the three-lens cemented lens toward the object side.

It is preferred that the condition expressions (3) and (4) below be satisfied:

$$0.01 < \theta gF1p - 0.6415 + 0.001618 \times vd1p \quad (3), \text{ and}$$

$$60 < vd1p \quad (4),$$

where L1p is one of the positive lenses included in the first lens group, θgF1p is a partial dispersion ratio of L1p, and vd1p is an Abbe number of L1p. It should be noted that even higher performance can be obtained when at least one, and more preferably both of the condition expressions (3-1) and (4-1) below are satisfied:

$$0.025 < \theta gF1p - 0.6415 + 0.001618 \times vd1p \quad (3\text{-}1),$$

$$75 < vd1p \quad (4\text{-}1).$$

It is preferred that the first lens group successively comprises, in order from the object side, four positive lenses.

The imaging apparatus of the invention comprises the above-described imaging lens of the invention.

It should be noted that the expression "consisting/consist essentially of" as used herein means that the imaging lens may include, besides the elements recited above: lenses substantially without any power; optical elements other than lenses, such as a stop, a mask, and a cover glass; and mechanical components, such as a lens flange, a lens barrel, an image sensor, and a camera shake correcting mechanism, etc.

The surface shape, and the sign (positive or negative) with respect to the refractive power of any lens including an aspheric surface among the above-described lenses are about the paraxial region.

The imaging lens of the invention consists essentially of, in order from the object side, a first lens group having a positive refractive power, a stop, and a second lens group having a positive refractive power, wherein the first lens group includes, in order from the object side, two successive positive lenses, and a negative lens having a concave surface toward the image side, the second lens group includes, in order from the object side, a lens having at least one aspheric surface, and a three-lens cemented lens, wherein the three-lens cemented lens is formed by cementing three lenses consisting of, in order from the object side, a positive lens having a convex surface toward the image side, a negative lens, and a positive lens, and the three-lens cemented lens has a positive refractive power. This configuration allows providing a large-aperture imaging lens having a small entire length while ensuring sufficient optical performance for use with a large image sensor.

The imaging apparatus of the invention, which is provided with the imaging lens of the invention, can be designed as a compact apparatus that can provide high image quality.

BRIEF DESCRIPTION OF THE DRAWINGS

FIG. 3 is a sectional view illustrating the lens configuration of an imaging lens of Example 3 of the invention, FIG. 4 is a sectional view illustrating the lens configuration of an imaging lens of Example 4 of the invention, FIG. 7 shows aberration diagrams of the imaging lens of Example 2 of the invention, FIG. 8 shows aberration diagrams of the imaging lens of Example 3 of the invention, FIG. 9 shows aberration diagrams of the imaging lens of Example 4 of the invention, FIG. 10 shows aberration diagrams of the imaging lens of Example 5 of the invention.

DESCRIPTION OF THE PREFERRED EMBODIMENTS

Figure 1:
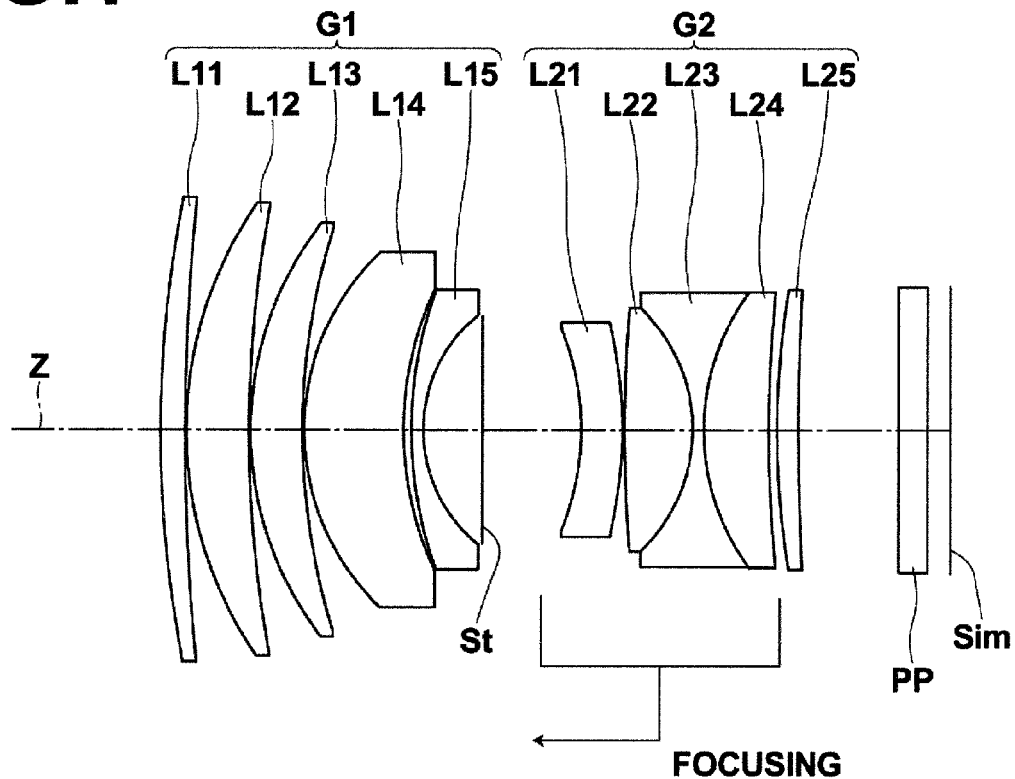
FIG. 1 is a sectional view illustrating the lens configuration of an imaging lens according to one embodiment of the invention (an imaging lens of Example 1)

Hereinafter, embodiments of the present invention will be described in detail with reference to the drawings. FIG. 1 is a sectional view illustrating the lens configuration of an imaging lens according to one embodiment of the invention. The configuration example shown in FIG. 1 is the same as the configuration of an imaging lens of Example 1, which will be described later. In FIG. 1, the left side is the object side and the right side is the image side.

As shown in FIG. 1, this imaging lens consists essentially of, in order from the object side along the optical axis Z, a first lens group G1 having a positive refractive power, an aperture stop St, and a second lens group G2 having a positive refractive power.

When this imaging lens is used with an imaging apparatus, it is preferred to provide a cover glass, a prism, various filters, such as an infrared cutoff filter and a low-pass filter, etc., between the optical system and an image plane Sim depending on the configuration of the camera on which the lens is mounted. In the example shown in FIG. 1, an optical member PP in the form of a plane-parallel plate, which is assumed to represent such elements, is disposed between the lens system and the image plane Sim.

The first lens group G1 includes, in order from the object side, two successive positive lenses, and a negative lens L15 having a concave surface toward the image side.

The second lens group G2 includes, in order from the object side, a lens L21 having at least one aspheric surface, and a three-lens cemented lens that is formed by cementing three lenses consisting of, in order from the object side, a positive lens L22 having a convex surface toward the image side, a negative lens L23, and a positive lens L24. The three-lens cemented lens has a positive refractive power.

In the lens system consisting essentially of, in order from the object side, the first lens group G1 having a positive refractive power, the aperture stop St, and the second lens group G2 having a positive refractive power, the lens configurations of the first lens group G1 and the second lens group G2 are preferably set to provide the imaging lens that has a small entire length, a large aperture, and high optical performance with successfully corrected aberrations, such as spherical aberration and chromatic aberration.

Further, disposing the Gaussian type lens, which is formed by the two successive positive lenses and the negative lens L15 having a concave surface toward the image side, on the object side of the aperture stop St allows successful correction of spherical aberration, and disposing the aspheric lens L21 and the three-lens cemented lens (L22 to L24) on the image side of the aperture stop St allows successful correction of spherical aberration, longitudinal chromatic aberration, and lateral chromatic aberration.

Still further, disposing the aspheric lens L21 on the image side and in the vicinity of the aperture stop St allows correcting spherical aberration without making a strong concave surface, and this allows preventing the back focus from becoming longer.

Yet further, the cemented lens formed by the positive lens L22, the negative lens L23, and the positive lens L24 allows successful correction without occurrence of total reflection of rays of light at each interface between the lenses. This three-lens cemented lens includes the two positive lenses disposed at the both ends thereof to have a positive refractive power, and this allows the two positive lenses to share the burden of correcting aberrations.

In the imaging lens of this embodiment, it is preferred that the first lens group G1 be fixed relative to the image plane during focusing from an object at infinity to a close object. In this case, focusing is performed by moving all or part of the second lens group G2, and the weight of the lenses to be moved is lighter than that in a case where focusing is performed by also moving the first lens group G1, and therefore improvement in focusing speed is expected.

Further, it is preferred that the condition expression (1) below be satisfied. When the lower limit of the condition expression (1) is not exceeded, increase of spherical aberration can be prevented to reduce the burden of correcting spherical aberration imposed on the aspheric lens L21, and this facilitates correction of field curvature. That is, satisfying the condition expression (1) allows successful correction of, mainly, spherical aberration and field curvature. It should be noted that higher performance can be obtained when the condition expression (1-1) below is satisfied.

$$1.8 < Nd2 \quad (1),$$

$$1.85 < Nd2 \quad (1\text{-}1),$$

where Nd2 is an average value of refractive indices with respect to the d-line of the positive lenses in the three-lens cemented lens.

Further, it is preferred that the condition expression (2) below be satisfied. When the condition expression (2) is satisfied, successful correction of, mainly, longitudinal chromatic aberration and lateral chromatic aberration can be achieved.

$$4 < vd2p - vd2n \quad (2),$$

where vd2p is the higher Abbe number between Abbe numbers with respect to the d-line of the two positive lenses in the three-lens cemented lens, and vd2n is an Abbe number with respect to the d-line of the negative lens in the three-lens cemented lens.

It is preferred that the first lens group G1 successively include, in order from the object side, a positive lens L11, a positive lens L12 with a convex surface toward the object side, and a positive meniscus lens L13 with a convex surface toward the object side. Disposing three or more positive lenses in the first lens group G1 in this manner is advantageous in providing an even larger aperture lens. It should be noted that even higher performance can be obtained when the first lens group G1 successively includes four positive lenses in order from the object side.

It is preferred that the second lens group G2 include, in order from the object side, the lens L21 having at least one aspheric surface, the above-described three-lens cemented lens (L22 to L24), and at least one positive lens L25, wherein, during focusing from an object at infinity to a close object, a part of the second lens group from a lens disposed on the image side of the three-lens cemented lens (L22 to L24) to a lens disposed at the most image side position in the second lens group G2 (in this embodiment, only the lens L25) is fixed relative to the image plane. This allows minimizing changes of spherical aberration and field curvature during focusing.

It should be noted that the focusing from an object at infinity to a close object is not limited to one that is achieved by moving a part of the second lens group G2 including the aspheric lens L21 and the three-lens cemented lens (L22 to L24), as described above, and the focusing may be achieved by moving the entire second lens group G2 toward the object side.

Further, it is preferred that the condition expressions (3) and (4) below be satisfied. When the condition expressions (3) and (4) below are satisfied, successful correction of, mainly, secondary spectrum of longitudinal chromatic aberration can be achieved. It should be noted that even higher performance can be obtained when at least one, and more preferably both of the condition expressions (3-1) and (4-1) below are satisfied.

$$0.01 < \theta gF1p - 0.6415 + 0.001618 \times vd1p \quad (3),$$

$$0.025 < \theta gF1p - 0.6415 + 0.001618 \times vd1p \quad (3\text{-}1),$$

$$60 < vd1p \quad (4),$$

$$75 < vd1p \quad (4\text{-}1),$$

where L1p is one of the positive lenses included in the first lens group, θgF1p is a partial dispersion ratio of L1p, and vd1p is an Abbe number of L1p. It should be noted that a partial dispersion ratio θgF between the g-line and the F-line of a certain lens is defined as θgF=(Ng−NF)/(NF−NC), where Ng, NF, NC are refractive indices with respect to the g-line, the F-line, and the C-line, respectively, of the lens.

As a material disposed on the most object side of the imaging lens, it is preferred to use, specifically, glass, or a transparent ceramic may be used.

In a case where the imaging lens is used in a harsh environment, it is preferred that the imaging lens be provided with a protective multi-layer coating. Besides the protective coating, the imaging lens may be provided with an antireflection coating for reducing ghost light, etc., during use.

In the example shown in FIG. 1, the optical member PP is disposed between the lens system and the image plane Sim. However, in place of disposing the various filters, such as a lowpass filter and a filter that cuts off a specific wavelength range, between the lens system and the image plane Sim, the various filters may be disposed between the lenses, or coatings having the same functions as the various filters may be applied to the lens surfaces of some of the lenses.

Next, numerical examples of the imaging lens of the invention are described.

First, an imaging lens of Example 1 is described. FIG. 1 is a sectional view illustrating the lens configuration of the imaging lens of Example 1. It should be noted that, in FIG. 1 and FIGS. 2 to 5 corresponding to Examples 2 to 5, which will be described later, the left side is the object side and the right side is the image side. The aperture stop St shown in the drawings does not necessarily represent the size and the shape thereof, but represents the position thereof along the optical axis Z.

Table 1 shows basic lens data of the imaging lens of Example 1, Table 2 shows data about specifications of the imaging lens, and Table 3 shows data about aspheric coefficients of the imaging lens. In the following description, meanings of symbols used in the tables are explained with respect to Example 1 as an example. The same explanations basically apply to those with respect to Examples 2 to 5.

In the lens data shown in Table 1, each value in the column of surface number represents each surface number, where the object-side surface of the most object-side element is the 1st surface and the number is sequentially increased toward the image side, each value in the column of radius of curvature represents the radius of curvature of each surface, and each value in the column of distance represents the distance along the optical axis Z between each surface and the next surface. Each value in the column of "nd" represents the refractive index with respect to the d-line (the wavelength of 587.6 nm) of each optical element, each value in the column of "νd" represents the Abbe number with respect to the d-line (the wavelength of 587.6 nm) of each optical element, and each value in the column of "θgF" represents the partial dispersion ratio of each optical element.

The sign with respect to the radius of curvature is provided such that a positive radius of curvature indicates a surface shape that is convex toward the object side, and a negative radius of curvature indicates a surface shape that is convex toward the image side. The basic lens data also includes data of the aperture stop St, and the surface number and the text "(stop)" are shown at the position in the column of the surface number corresponding to the aperture stop St.

The data about specifications shown in Table 2 show values of focal length (f), back focus (BF), total angle of view (2ω), and f-number (Fno).

In the lens data shown in Table 1, the symbol "*" is added to the surface number of each aspheric shape, and a numerical value of the paraxial radius of curvature is shown as the radius of curvature of each aspheric surface. In the data about aspheric coefficients shown in Table 3, the surface number of each aspheric surface and aspheric coefficients about each aspheric surface are shown. The aspheric coefficients are values of the coefficients K and Am (where m=3, 4, 5, . . . , 20) in the formula (A) of aspheric surface shown below:

$$Zd = C \cdot h^2 / \{1 + (1 - K \cdot C^2 \cdot h^2)^{1/2}\} + \Sigma Am \cdot h^m \quad (A),$$

where Zd is a depth of the aspheric surface (a length of a perpendicular line from a point with a height h on the aspheric surface to a plane tangent to the apex of the aspheric surface and perpendicular to the optical axis), h is the height (a distance from the optical axis), C is a reciprocal of the paraxial radius of curvature, and K and Am are aspheric coefficients (where m=3, 4, 5, . . . , 20).

With respect to the basic lens data and data about the conditional expressions, the unit of angle is degrees, and the unit of length is millimeters; however, any other suitable units may be used since optical systems are usable when they are proportionally enlarged or reduced.

TABLE 1

Example 1
Lens Data (n and ν are with respect to the d-line)

| Surface No. | Radius of Curvature | Distance | nd | νd | θgF |
|---|---|---|---|---|---|
| 1 | 118.040 | 2.45 | 1.69680 | 55.5 | |
| 2 | 226.170 | 0.15 | | | |
| 3 | 39.651 | 6.20 | 1.49700 | 81.6 | |
| 4 | 122.610 | 0.15 | | | |

TABLE 1-continued

Example 1
Lens Data (n and ν are with respect to the d-line)

| Surface No. | Radius of Curvature | Distance | nd | νd | θgF |
|---|---|---|---|---|---|
| 5 | 33.611 | 5.10 | 1.49700 | 81.6 | 0.5375 |
| 6 | 66.540 | 0.15 | | | |
| 7 | 24.239 | 9.93 | 1.49700 | 81.6 | |
| 8 | 33.111 | 0.75 | | | |
| 9 | 40.570 | 1.19 | 1.68893 | 31.2 | |
| 10 | 14.632 | 5.82 | | | |
| 11 (stop) | ∞ | 9.80 | | | |
| *12 | −25.211 | 4.15 | 1.80610 | 40.9 | |
| *13 | −39.046 | 0.21 | | | |
| 14 | 155.760 | 6.71 | 1.88300 | 40.8 | |
| 15 | −16.669 | 1.08 | 1.64769 | 33.8 | |
| 16 | 23.016 | 6.43 | 1.88300 | 40.8 | |
| 17 | 130.660 | 0.84 | | | |
| 18 | 83.297 | 2.12 | 2.00069 | 25.5 | |
| 19 | 248.430 | 10.00 | | | |
| 20 | ∞ | 2.80 | 1.51680 | 64.2 | |
| 21 | ∞ | | | | |

TABLE 2

Example 1
Specifications (d-line)

| | |
|---|---|
| f | 56.74 |
| BF | 14.15 |
| 2ω | 28.2 |
| Fno | 1.25 |

TABLE 3

Example 1
Aspheric Coefficients

| Surface No. | 12 | 13 |
|---|---|---|
| K | 0.0000000E+00 | 0.0000000E+00 |
| A3 | −5.4390191E−06 | 2.0197209E−05 |
| A4 | 7.6906609E−06 | 4.6316479E−06 |
| A5 | −1.9892955E−06 | 1.2763791E−06 |
| A6 | 1.3009389E−07 | −1.0982860E−07 |
| A7 | 2.1383723E−09 | −9.4499747E−10 |
| A8 | −3.5100915E−10 | 3.6819654E−10 |
| A9 | −2.3107027E−11 | 2.2509649E−11 |
| A10 | −3.4335228E−13 | 2.7190007E−13 |
| A11 | 5.0905398E−14 | −5.8050703E−14 |
| A12 | 5.4740741E−15 | −6.2170865E−15 |
| A13 | 3.1623233E−16 | −3.8573259E−16 |
| A14 | 9.8821792E−18 | −1.6015358E−17 |
| A15 | −2.9640085E−19 | −2.0425376E−19 |
| A16 | −8.1938746E−20 | 4.2635187E−20 |
| A17 | −8.9348387E−21 | 5.9320562E−21 |
| A18 | −7.6842542E−22 | 5.4278679E−22 |
| A19 | −5.8823241E−23 | 4.2137980E−23 |
| A20 | −4.2010122E−24 | 2.9861951E−24 |

Figure 6:
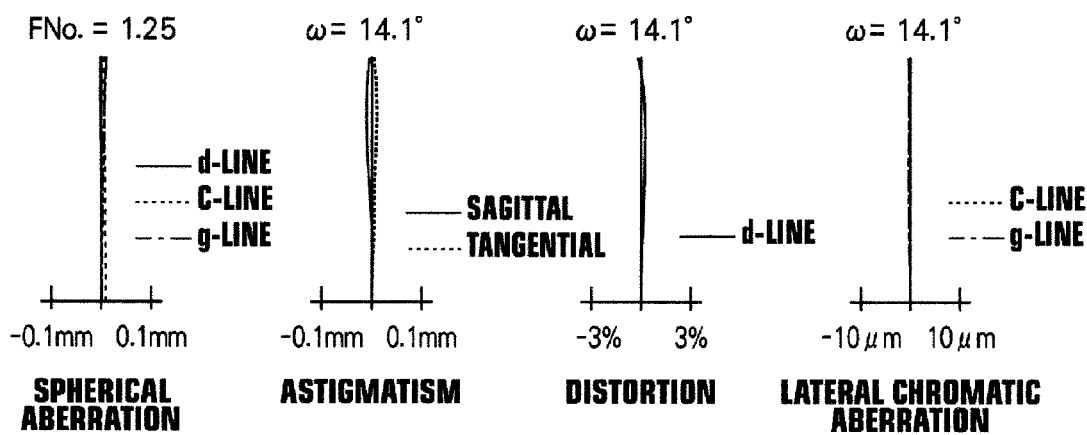
FIG. 6 shows aberration diagrams of the imaging lens of Example 1 of the invention.

FIG. 6 shows aberration diagrams of the imaging lens of Example 1. The aberration diagrams shown in FIG. 6 are those of spherical aberration, astigmatism, distortion, and lateral chromatic aberration in order from the left side. The aberration diagrams of spherical aberration, astigmatism, and distortion show those with respect to the d-line (the wavelength of 587.6 nm), which is used as a reference wavelength. The aberration diagram of spherical aberration shows those with respect to the d-line (the wavelength of 587.6 nm), the C-line (the wavelength of 656.3 nm), and the g-line (the wavelength of 435.8 nm) in the solid line, the dotted line, and the dashed-dotted line, respectively. The aberration diagram of astigmatism shows those in the sagittal direction and the tangential direction in the solid line and the dotted line, respectively. The aberration diagram of lateral chromatic aberration shows those with respect to the C-line (the wavelength of 656.3 nm) and the g-line (the wavelength of 435.8 nm) in the dotted line and the dashed-dotted line, respectively. The "Fno." in the aberration diagram of spherical aberration means "f-number", and the "ω" in the other aberration diagrams means "half angle of view".

Figure 2:
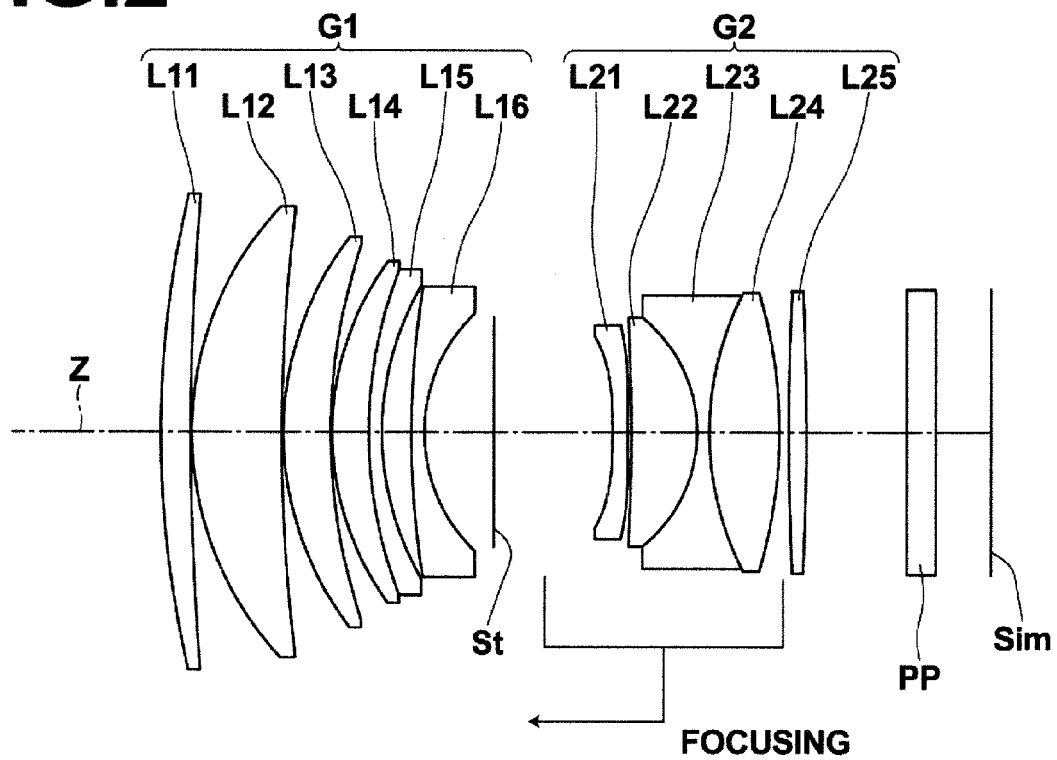
FIG. 2 is a sectional view illustrating the lens configuration of an imaging lens of Example 2 of the invention.

Next, an imaging lens of Example 2 is described. FIG. 2 shows a sectional view illustrating the lens configuration of the imaging lens of Example 2. Table 4 shows basic lens data of the imaging lens of Example 2, Table 5 shows data about specifications of the imaging lens, Table 6 shows data about aspheric coefficients of the imaging lens, and FIG. 7 shows aberration diagrams of the imaging lens.

TABLE 4

Example 2
Lens Data (n and ν are with respect to the d-line)

| Surface No. | Radius of Curvature | Distance | nd | νd | θgF |
|---|---|---|---|---|---|
| 1 | 103.830 | 2.92 | 1.48749 | 70.2 | |
| 2 | 283.140 | 0.15 | | | |
| 3 | 32.690 | 8.96 | 1.49700 | 81.6 | |
| 4 | 185.200 | 0.15 | | | |
| 5 | 32.050 | 4.63 | 1.49700 | 81.6 | 0.5375 |
| 6 | 58.770 | 0.15 | | | |
| 7 | 28.790 | 3.62 | 1.88300 | 40.8 | |
| 8 | 44.730 | 1.31 | 1.75211 | 25.1 | |
| 9 | 28.870 | 2.93 | | | |
| 10 | 91.920 | 1.30 | 1.67300 | 38.2 | |
| 11 | 16.390 | 6.87 | | | |
| 12 (stop) | ∞ | 11.73 | | | |
| *13 | −83.990 | 1.50 | 1.58313 | 59.4 | |
| *14 | 111.200 | 0.39 | | | |
| 15 | −193.970 | 6.56 | 2.00100 | 29.1 | |
| 16 | −14.500 | 1.19 | 1.80810 | 22.8 | |
| 17 | 30.280 | 6.93 | 2.00100 | 29.1 | |
| 18 | −48.150 | 0.90 | | | |
| 19 | 293.180 | 1.77 | 1.48749 | 70.2 | |
| 20 | −293.180 | 10.00 | | | |
| 21 | ∞ | 2.80 | 1.51680 | 64.2 | |
| 22 | ∞ | | | | |

TABLE 5

Example 2
Specifications (d-line)

| f | 56.64 |
|---|---|
| BF | 17.35 |
| 2ω | 28.2 |
| Fno | 1.25 |

TABLE 6

Example 2
Aspheric Coefficients

| Surface No. | 13 | 14 |
|---|---|---|
| K | 0.0000000E+00 | 0.0000000E+00 |
| A3 | 4.2425135E−04 | 3.5009218E−04 |
| A4 | −6.3565111E−04 | −5.1294420E−04 |
| A5 | 1.5141534E−04 | 1.1350612E−04 |
| A6 | −1.4455559E−05 | −1.0258738E−05 |
| A7 | −4.3619452E−06 | −3.6767854E−06 |
| A8 | 1.1549048E−06 | 1.2407439E−06 |

TABLE 6-continued

Example 2
Aspheric Coefficients

| Surface No. | 13 | 14 |
|---|---|---|
| A9 | −8.1599752E−09 | −8.9824466E−08 |
| A10 | −2.0798418E−08 | −1.9805153E−08 |
| A11 | 1.8896920E−09 | 4.6428446E−09 |
| A12 | −7.7225202E−11 | −2.0450947E−10 |
| A13 | −3.5276438E−12 | −4.8041079E−11 |
| A14 | 5.6690626E−12 | 6.9487352E−12 |
| A15 | −7.1519469E−13 | −5.5601733E−14 |
| A16 | −3.4765359E−14 | −5.2312392E−14 |
| A17 | 9.4964095E−15 | 3.3641782E−15 |
| A18 | −1.8369344E−16 | 6.5265536E−17 |
| A19 | −3.5656607E−17 | −1.2833826E−17 |
| A20 | 1.5813241E−18 | 3.4385836E−19 |

Next, an imaging lens of Example 3 is described. FIG. 3 shows a sectional view illustrating the lens configuration of the imaging lens of Example 3. Table 7 shows basic lens data of the imaging lens of Example 3, Table 8 shows data about specifications of the imaging lens, Table 9 shows data about aspheric coefficients of the imaging lens, and FIG. 8 shows aberration diagrams of the imaging lens.

TABLE 7

Example 3
Lens Data (n and ν are with respect to the d-line)

| Surface No. | Radius of Curvature | Distance | nd | νd | θgF |
|---|---|---|---|---|---|
| 1 | 163.410 | 2.59 | 1.48749 | 70.2 | |
| 2 | 1252.600 | 0.15 | | | |
| 3 | 32.582 | 9.16 | 1.49700 | 81.6 | |
| 4 | 177.380 | 0.15 | | | |
| 5 | 31.661 | 4.54 | 1.49700 | 81.6 | 0.5375 |
| 6 | 55.403 | 0.40 | | | |
| 7 | 28.432 | 3.99 | 1.88300 | 40.8 | |
| 8 | 51.536 | 1.30 | 1.75211 | 25.1 | |
| 9 | 28.992 | 2.96 | | | |
| 10 | 89.503 | 1.21 | 1.67300 | 38.2 | |
| 11 | 15.974 | 6.22 | | | |
| 12 (stop) | ∞ | 11.59 | | | |
| *13 | −187.802 | 1.50 | 1.58313 | 59.4 | |
| *14 | 74.266 | 0.39 | | | |
| 15 | −193.910 | 6.96 | 1.88300 | 40.8 | |
| 16 | −13.865 | 1.21 | 1.66680 | 33.0 | |
| 17 | 29.688 | 6.63 | 1.88300 | 40.8 | |
| 18 | −55.427 | 0.90 | | | |
| 19 | 289.870 | 1.81 | 1.48749 | 70.2 | |
| 20 | −289.870 | 10.00 | | | |
| 21 | ∞ | 2.80 | 1.51680 | 64.2 | |
| 22 | ∞ | | | | |

TABLE 8

Example 3
Specifications (d-line)

| f | 56.98 |
|---|---|
| BF | 16.53 |
| 2ω | 28.0 |
| Fno | 1.25 |

TABLE 9

Example 3
Aspheric Coefficients

| Surface No. | 13 | 14 |
|---|---|---|
| K | 0.0000000E+00 | 0.0000000E+00 |
| A3 | 3.8393566E−04 | 3.2574414E−04 |
| A4 | −6.2592552E−04 | −5.1485989E−04 |
| A5 | 1.4778350E−04 | 1.1258987E−04 |
| A6 | −1.4352983E−05 | −1.0452190E−05 |
| A7 | −4.3588543E−06 | −3.6580954E−06 |
| A8 | 1.1550101E−06 | 1.2413561E−06 |
| A9 | −8.1701706E−09 | −8.9862297E−08 |
| A10 | −2.0799721E−08 | −1.9808269E−08 |
| A11 | 1.8896154E−09 | 4.6427534E−09 |
| A12 | −7.7228059E−11 | −2.0450812E−10 |
| A13 | −3.5277023E−12 | −4.8040730E−11 |
| A14 | 5.6690635E−12 | 6.9487622E−12 |
| A15 | −7.1519452E−13 | −5.5600157E−14 |
| A16 | −3.4765348E−14 | −5.2312313E−14 |
| A17 | 9.4964100E−15 | 3.3641818E−15 |
| A18 | −1.8369342E−16 | 6.5265695E−17 |
| A19 | −3.5656606E−17 | −1.2833819E−17 |
| A20 | 1.5813241E−18 | 3.4385862E−19 |

Next, an imaging lens of Example 4 is described. FIG. 4 shows a sectional view illustrating the lens configuration of the imaging lens of Example 4. Table 10 shows basic lens data of the imaging lens of Example 4, Table 11 shows data about specifications of the imaging lens, Table 12 shows data about aspheric coefficients of the imaging lens, and FIG. 9 shows aberration diagrams of the imaging lens.

TABLE 10

Example 4
Lens Data (n and ν are with respect to the d-line)

| Surface No. | Radius of Curvature | Distance | nd | νd | θgF |
|---|---|---|---|---|---|
| 1 | 128.370 | 2.46 | 1.69680 | 55.5 | |
| 2 | 265.790 | 0.15 | | | |
| 3 | 38.580 | 6.84 | 1.59282 | 68.6 | |
| 4 | 151.210 | 0.15 | | | |
| 5 | 32.440 | 3.48 | 1.49700 | 81.6 | 0.5375 |
| 6 | 42.870 | 0.15 | | | |
| 7 | 26.340 | 8.63 | 1.49700 | 81.6 | |
| 8 | 55.730 | 0.50 | | | |
| 9 | 67.070 | 4.06 | 1.67270 | 32.1 | |
| 10 | 15.010 | 5.76 | | | |
| 11 (stop) | ∞ | 9.80 | | | |
| *12 | −23.630 | 3.72 | 1.80610 | 40.9 | |
| *13 | −37.530 | 0.17 | | | |
| 14 | 155.810 | 6.42 | 1.95375 | 32.3 | |
| 15 | −16.680 | 1.08 | 1.76182 | 26.5 | |
| 16 | 24.020 | 5.30 | 1.95375 | 32.3 | |
| 17 | 0.000 | 0.83 | | | |
| 18 | 83.250 | 2.14 | 2.00069 | 25.5 | |
| 19 | 249.600 | 10.00 | | | |
| 20 | ∞ | 2.80 | 1.51680 | 64.2 | |
| 21 | ∞ | | | | |

TABLE 11

Example 4
Specifications (d-line)

| | |
|---|---|
| f | 56.73 |
| BF | 15.39 |
| 2ω | 28.2 |
| Fno | 1.25 |

TABLE 12

Example 4
Aspheric Coefficients

| Surface No. | 12 | 13 |
|---|---|---|
| K | 0.0000000E+00 | 0.0000000E+00 |
| A3 | 6.4630286E−06 | 3.0945225E−05 |
| A4 | 1.0670362E−05 | 5.9764825E−06 |
| A5 | −2.0763456E−06 | 1.0955266E−06 |
| A6 | 1.2896918E−07 | −1.0398627E−07 |
| A7 | 2.6103662E−09 | −8.4538472E−10 |
| A8 | −3.3670462E−10 | 3.5832138E−10 |
| A9 | −2.3398034E−11 | 2.1720451E−11 |
| A10 | −3.7339644E−13 | 2.3353743E−13 |
| A11 | 5.0851514E−14 | −5.9444280E−14 |
| A12 | 5.6050217E−15 | −6.2388575E−15 |
| A13 | 3.2955709E−16 | −3.8333518E−16 |
| A14 | 1.0795749E−17 | −1.5678501E−17 |
| A15 | −2.4467662E−19 | −1.7558536E−19 |
| A16 | −7.9345536E−20 | 4.4642446E−20 |
| A17 | −8.8158978E−21 | 6.0574364E−21 |
| A18 | −7.6335102E−22 | 5.5002855E−22 |
| A19 | −5.8620456E−23 | 4.2532673E−23 |
| A20 | −4.1934292E−24 | 3.0067592E−24 |

Figure 5:
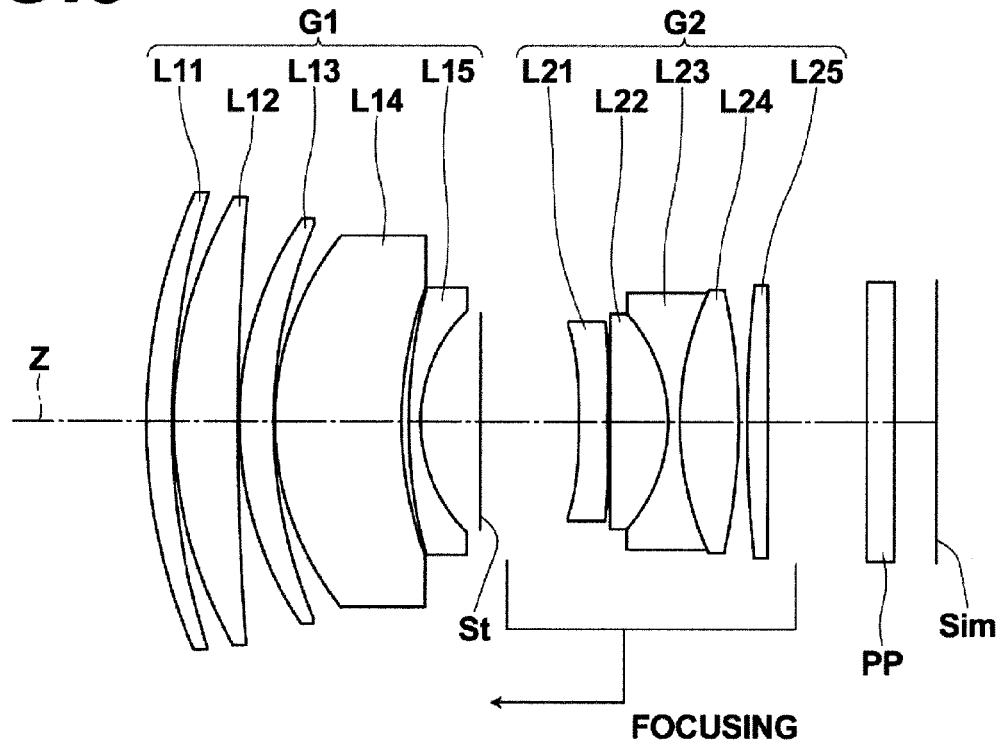
FIG. 5 is a sectional view illustrating the lens configuration of an imaging lens of Example 5 of the invention.

Next, an imaging lens of Example 5 is described. FIG. 5 shows a sectional view illustrating the lens configuration of the imaging lens of Example 5. Table 13 shows basic lens data of the imaging lens of Example 5, Table 14 shows data about specifications of the imaging lens, Table 15 shows data about aspheric coefficients of the imaging lens, and FIG. 10 shows aberration diagrams of the imaging lens. It should be noted that only Example 5 shows an aspect where the entire second lens group G2 is moved toward the object side during focusing from an object at infinity to a close object.

TABLE 13

Example 5
Lens Data (n and ν are with respect to the d-line)

| Surface No. | Radius of Curvature | Distance | nd | νd | θgF |
|---|---|---|---|---|---|
| 1 | 56.980 | 2.61 | 1.69680 | 55.5 | |
| 2 | 73.810 | 0.15 | | | |
| 3 | 45.040 | 6.47 | 1.49700 | 81.6 | |
| 4 | 282.620 | 0.15 | | | |
| 5 | 36.670 | 3.40 | 1.49700 | 81.6 | 0.5375 |
| 6 | 50.740 | 0.15 | | | |
| 7 | 29.690 | 12.77 | 1.91082 | 35.3 | |
| 8 | 39.260 | 0.72 | | | |
| 9 | 51.650 | 1.20 | 1.84666 | 23.8 | |
| 10 | 15.690 | 6.04 | | | |
| 11 (stop) | ∞ | 9.88 | | | |
| *12 | −91.920 | 2.90 | 1.80610 | 40.9 | |
| *13 | 175.110 | 0.23 | | | |
| 14 | 0.000 | 5.87 | 1.95375 | 32.3 | |
| 15 | −16.210 | 1.17 | 1.78472 | 25.7 | |
| 16 | 31.460 | 5.87 | 1.95375 | 32.3 | |
| 17 | −61.230 | 0.86 | | | |
| 18 | 128.910 | 2.12 | 2.00069 | 25.5 | |
| 19 | −1721.890 | 10.00 | | | |
| 20 | ∞ | 2.80 | 1.51680 | 64.2 | |
| 21 | ∞ | | | | |

TABLE 14

Example 5
Specifications (d-line)

| | |
|---|---|
| f | 56.75 |
| BF | 16.06 |

TABLE 14-continued

Example 5
Specifications (d-line)

| 2ω | 28.2 |
|---|---|
| Fno | 1.25 |

TABLE 15

Example 5
Aspheric Coefficients

| Surface No. | 12 | 13 |
|---|---|---|
| K | 0.0000000E+00 | 0.0000000E+00 |
| A3 | −1.8596950E−05 | 1.0642420E−05 |
| A4 | −7.5650825E−05 | −7.7574207E−05 |
| A5 | −1.1457091E−06 | 2.2802053E−06 |
| A6 | 1.8461225E−07 | −2.7506440E−09 |
| A7 | 4.2023954E−09 | −5.5285163E−10 |
| A8 | −3.1989217E−10 | 2.4912432E−10 |
| A9 | −2.4861296E−11 | 1.7566501E−11 |
| A10 | −5.1551585E−13 | 2.0782484E−13 |
| A11 | 4.1625728E−14 | −5.5321508E−14 |
| A12 | 5.0490699E−15 | −6.0875835E−15 |
| A13 | 2.9587829E−16 | −3.9145640E−16 |
| A14 | 8.7354972E−18 | −1.7185854E−17 |
| A15 | −3.6961409E−19 | −3.0716655E−19 |
| A16 | −8.6732385E−20 | 3.5674115E−20 |
| A17 | −9.2383532E−21 | 5.5220855E−21 |
| A18 | −7.8667423E−22 | 5.2065229E−22 |
| A19 | −5.9864920E−23 | 4.1012233E−23 |
| A20 | −4.2577717E−24 | 2.9313767E−24 |

Table 16 shows values corresponding to the condition expressions (1) to (4) of the imaging lenses of Examples 1 to 5. In all the examples, the d-line is used as a reference wavelength, and the values shown in Table 16 below are with respect to the reference wavelength.

TABLE 16

| No. | Condition Expression | Example 1 | Example 2 | Example 3 | Example 4 | Example 5 |
|---|---|---|---|---|---|---|
| (1) | Nd2 | 1.88300 | 2.00100 | 1.88300 | 1.95375 | 1.95375 |
| (2) | νd2p − νd2n | 7.0 | 6.3 | 7.8 | 5.8 | 6.6 |
| (3) | θgF1p − 0.6415 + 0.001618 × νd1p | 0.0280 | 0.0280 | 0.0280 | 0.0280 | 0.0280 |
| (4) | νd1p | 81.6 | 81.6 | 81.6 | 81.6 | 81.6 |

As can be seen from the data shown above, all the imaging lenses of Examples 1 to 5 satisfy the condition expressions (1) to (4). With respect to the f-number, all the imaging lenses of Examples 1 to 5 achieve a design with an f-number of F1.4 or less, or F1.3 or less. Thus, it can be seen that each of them is a large-aperture imaging lens having a small entire length while ensuring sufficient optical performance for use with a large image sensor.

Figure 11:
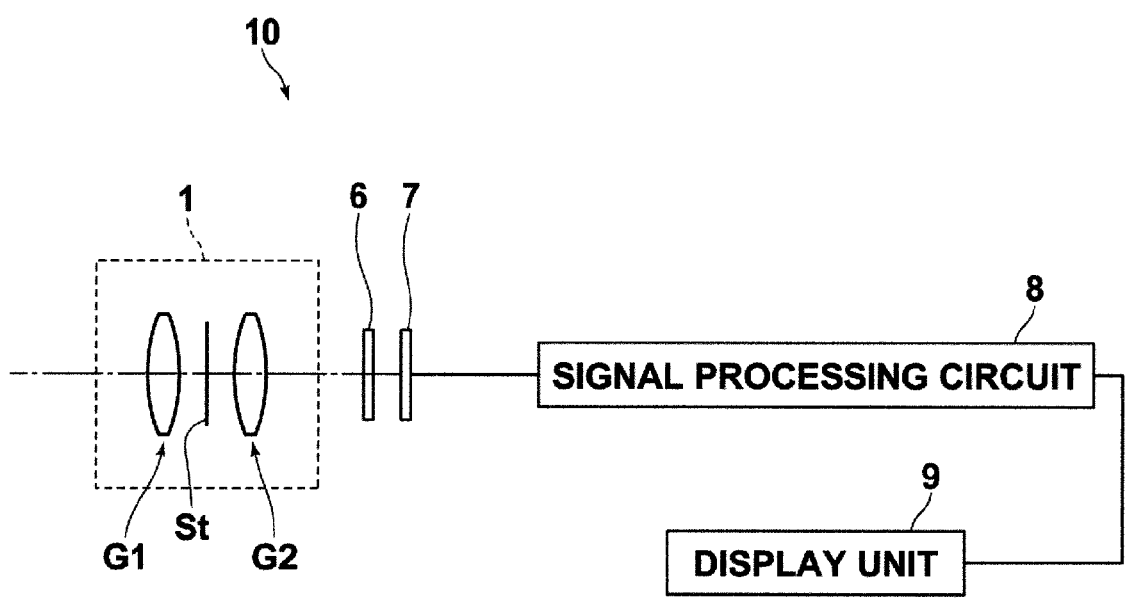
FIG. 11 is a diagram illustrating the schematic configuration of an imaging apparatus according to an embodiment of the invention.

Next, an imaging apparatus according to an embodiment of the invention is described. FIG. 11 is a diagram illustrating the schematic configuration of an imaging apparatus employing the imaging lens of the embodiment of the invention, which is one example of the imaging apparatus of the embodiment of the invention. It should be noted that the lens groups are schematically shown in FIG. 11. Examples of the imaging apparatus may include a video camera and an electronic still camera which include a solid-state image sensor, such as a CCD or CMOS, serving as a recording medium.

The imaging apparatus 10 shown in FIG. 11 includes an imaging lens 1; a filter 6 having a function of a low-pass filter, etc., disposed on the image side of the imaging lens 1; an image sensor 7 disposed on the image side of the filter 6; and a signal processing circuit 8. The image sensor 7 converts an optical image formed by the imaging lens 1 into an electric signal. As the image sensor 7, a CCD (Charge Coupled Device) or a CMOS (Complementary Metal Oxide Semiconductor), for example, may be used. The image sensor 7 is disposed such that the imaging surface thereof is positioned in the same position as the image plane of the imaging lens 1.

An image taken through the imaging lens 1 is formed on the imaging surface of the image sensor 7. Then, a signal about the image outputted from the image sensor 7 is processed by the signal processing circuit 8, and the image is displayed on a display unit 9.

The present invention has been described with reference to the embodiments and the examples. However, the invention is not limited to the above-described embodiments and examples, and various modifications may be made to the invention. For example, the values of the radius of curvature, the surface distance, the refractive index, the Abbe number, etc., of each lens element are not limited to the values shown in the above-described numerical examples and may take different values.

What is claimed is:

1. An imaging lens consisting of, in order from an object side:
   a first lens group having a positive refractive power;
   a stop; and
   a second lens group having a positive refractive power,
   wherein the first lens group comprises, in order from the object side, two successive positive lenses, and a negative lens having a concave surface toward an image side, and
   the second lens group comprises, in order from the object side, a lens having at least one aspheric surface, and a three-lens cemented lens, wherein the three-lens cemented lens is formed by cementing three lenses consisting of, in order from the object side, a positive lens having a convex surface toward the image side, a negative lens, and a positive lens, and the three-lens cemented lens has a positive refractive power,
   wherein the condition expression (1) below is satisfied:

$$1.8 < Nd2 \tag{1}$$

where Nd2 is an average value of refractive indices with respect to the d-line of the positive lenses in the three-lens cemented lens.

2. The imaging lens as claimed in claim 1, wherein the first lens group is fixed relative to an image plane during focusing from an object at infinity to a close object.

3. The imaging lens as claimed in claim 1, wherein the condition expression (2) below is satisfied:

$$4 < \nu d2p - \nu d2n \tag{2}$$

where vd2p is an Abbe number of a positive lens having a higher Abbe number with respect to the d-line than that of the other of the two positive lenses in the three-lens cemented lens, and vd2n is an Abbe number with respect to the d-line of the negative lens in the three-lens cemented lens.

4. An imaging lens consisting of, in order from an object side:
- a first lens group having a positive refractive power;
- a stop; and
- a second lens group having a positive refractive power,
- wherein the first lens group comprises, in order from the object side, two successive positive lenses, and a negative lens having a concave surface toward an image side, and
- the second lens group comprises, in order from the object side, a lens having at least one aspheric surface, and a three-lens cemented lens, wherein the three-lens cemented lens is formed by cementing three lenses consisting of, in order from the object side, a positive lens having a convex surface toward the image side, a negative lens, and a positive lens, and the three-lens cemented lens has a positive refractive power,
- wherein the first lens group successively comprises, in order from the object side, a positive lens, a positive lens having a convex surface toward the object side, and a positive meniscus lens having a convex surface toward the object side.

5. The imaging lens as claimed in claim 1, wherein the second lens group comprises, in order from the object side, a lens having at least one aspheric surface, the three-lens cemented lens, and at least one positive lens, wherein, during focusing from an object at infinity to a close object, a part of the second lens group from a lens disposed on the image side of the three-lens cemented lens to a lens disposed at the most image side position in the second lens group is fixed relative to an image plane.

6. An imaging lens consisting of, in order from an object side:
- a first lens group having a positive refractive power;
- a stop; and
- a second lens group having a positive refractive power,
- wherein the first lens group comprises, in order from the object side, two successive positive lenses, and a negative lens having a concave surface toward an image side, and
- the second lens group comprises, in order from the object side, a lens having at least one aspheric surface, and a three-lens cemented lens, wherein the three-lens cemented lens is formed by cementing three lenses consisting of, in order from the object side, a positive lens having a convex surface toward the image side, a negative lens, and a positive lens, and the three-lens cemented lens has a positive refractive power,
- wherein focusing from an object at infinity to a close object is performed by moving the entire second lens group toward the object side or by moving a part of the second lens group including the lens having at least one aspheric surface and the three-lens cemented lens toward the object side.

7. The imaging lens as claimed in claim 1, wherein the condition expressions (3) and (4) below are satisfied:

$$0.01 < \theta gF1p - 0.6415 + 0.001618 \times vd1p \quad (3), \text{ and}$$

$$60 < vd1p \quad (4),$$

where L1p is one of the positive lenses included in the first lens group, θgF1p is a partial dispersion ratio of L1p, and vd1p is an Abbe number of L1p.

8. The imaging lens as claimed in claim 1, wherein the first lens group successively comprises, in order from the object side, four positive lenses.

9. The imaging lens as claimed in claim 1, wherein the condition expression (1-1) below is satisfied:

$$1.85 < Nd2 \quad (1\text{-}1),$$

where Nd2 is an average value of refractive indices with respect to the d-line of the positive lenses in the three-lens cemented lens.

10. The imaging lens as claimed in claim 7, wherein the condition expression (3-1) below is satisfied:

$$0.025 < \theta gF1p - 0.6415 + 0.001618 \times vd1p \quad (3\text{-}1),$$

where L1p is one of the positive lenses included in the first lens group, and θgF1p is a partial dispersion ratio of L1p.

11. The imaging lens as claimed in claim 7, wherein the condition expression (4-1) below is satisfied:

$$75 < vd1p \quad (4\text{-}1),$$

where L1p is one of the positive lenses included in the first lens group, and vd1p is an Abbe number of L1p.

12. An imaging apparatus comprising the imaging lens as claimed in claim 1.

13. An imaging apparatus comprising the imaging lens as claimed in claim 4.

14. An imaging apparatus comprising the imaging lens as claimed in claim 6.

* * * * *